Jan. 26, 1965    R. B. COTTON    3,167,277
ARREST CABLE SUPPORT
Filed June 12, 1963

INVENTOR
Robert B. Cotton

BY *Herbert M. Birch*

ATTORNEYS

United States Patent Office 3,167,277
Patented Jan. 26, 1965

3,167,277
ARREST CABLE SUPPORT
Robert B. Cotton, Media, Pa., assignor to All American Engineering Company, Wilmington, Del., a corporation of Delaware
Filed June 12, 1963, Ser. No. 287,417
13 Claims. (Cl. 244—110)

The present invention relates to aircraft arresting equipment and more particularly to aircraft arrest cable support means. Such cables are known as runway cross cables, deck pendants and the like.

In the majority of aircraft arresting installations used on landing strips and runways, it is the usual thing for landing aircraft to be equipped with a cable engaging arrest hook adapted to hook or engage an arrest cable. The arrest cable is connected at each end to some form of aircraft energy absorbing and decelerating equipment. This energy absorber and decelerating equipment is usually mounted on one or both sides of a landing area and it cannot be harnessed to provide operative aircraft arresting action unless the arrest cable is positively engaged by the arrest cable hook of the aircraft. Often the arrest cable is not properly supported in a hook engaging position and the hook may bounce over the cable because it is not properly elevated and/or positioned over the landing area and the aircraft may overrun the landing area with very unsatisfactory results.

The prior art has made some atttempts at arrest cable support and this cable support is an improvement, for example, over prior co-pending application Serial Number 210,931 invented by Howard Sanders Green and which application is assigned entire right, title and interest to All American Engineering Company, Wilmington, Delaware, U.S.A.

In this prior co-pending application of the present assignee, which has been operationally successful, the arrest cable may be raised from a flush arrest surface position to an elevated aircraft hook engaging position, by an inflatable tube. This tube when inflated becomes exposed and extends completely across the arrest surface and is formed in one elongated section, so that when the hook on an aircraft being arrested is to engage the arrest cable it strikes the tube, ruptures the same and carries the whole tube with the cable down the runway or landing surface to aircraft arrest position.

After each arrest a complete new tube and supporting structures therefor must be furnished and installed for the next arrest. This complete replacement requires more work than is desirable and also makes the cost of each arrest action high, since the tubes and associated parts therefor must all be replaced. Furthermore, the time required for such complete replacement is objectionable for rapid take-off and landing operations.

Accordingly an object of this invention is to provide a novel cable support, whereby the above difficult problems are effectively solved, for example, the present novel support is made in sectional cable supporting structures of a material which is either pierced or disintegrated by the point of the arrest hook instead of deflecting the supporting structures by the crash contact of the hook.

Another object is to provide a cable support which is flush with the runway surface when not in use and which is completely retractable to allow a snow plow or debris cleaner to clean off the runway without damaging the cable support.

Another object is to provide a concealed low pressure pneumatic tube inflatable and deflatable from a remote location such as from a control tower and whereby the low pressure cable support tube greatly reduces cable bounce up from the cable support during an arrest or high speed taxi operation, which may cause damage to the airplane.

Another object is to provide a novel support, whereby a standard type arresting hook which has a sharp edge close to the runway when extended from the craft is used to obtain optimum results.

Still another object is to provide a novel arresting cable support, whereby the cable may be replaced in arrest position within two minutes or less after each arrest.

Another object is to provide a novel arresting cable support which is inexpensive and easy to install even on concrete runways without appreciable cut away of runway surface for installations.

Yet another object is to provide a novel arresting cable structure which requires a minimum of damage and expense following each arrestment to prepare the same for the next arrest operation.

Another object is to provide a novel continuous supporting structure for an arrest cable, whereby less tension on the cable than heretofore is required and whereby there is no problem of looping or sagging of the cable.

Other objects and advantages will become apparent in the course of the following detailed description, taken in connection with the accompanying drawings, wherein.

Figure 3:
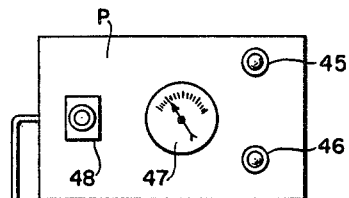
FIGURE 3 is a front view of a remote control panel in a diagrammatic illustration.
Figure 1:
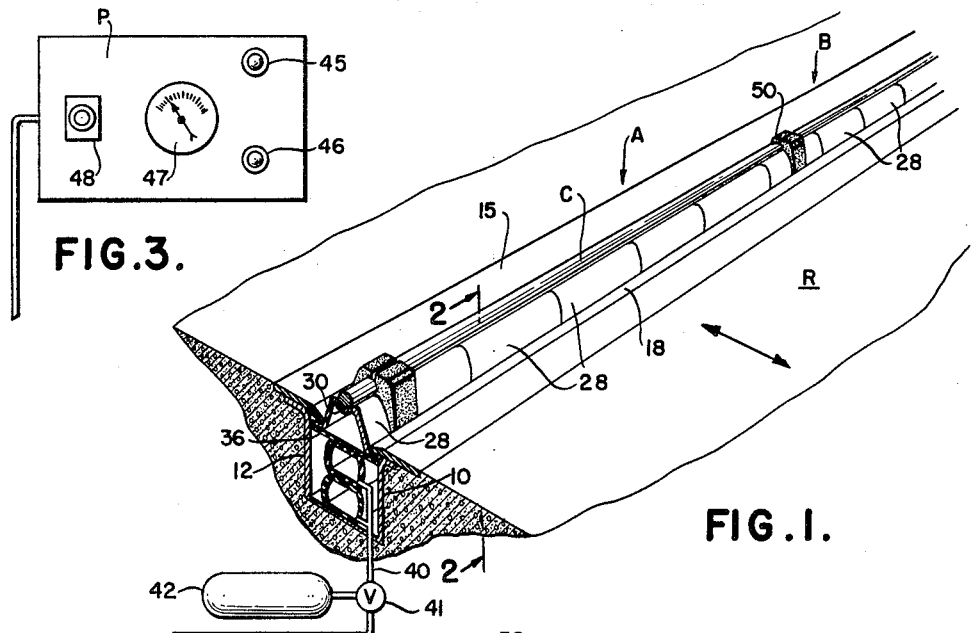
FIGURE 1 is a top plan view of a landing surface showing the novel arresting cable support in an isometric drawing partly cut away in cross section.
Figure 4:
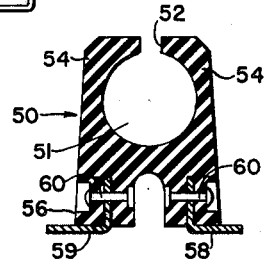
FIGURE 4 is a front elevation view of one of the neoprene cable holders.
Figure 5:
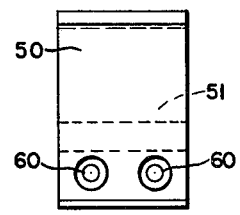
FIGURE 5 is a side elevation of FIGURE 4.
Figure 2:
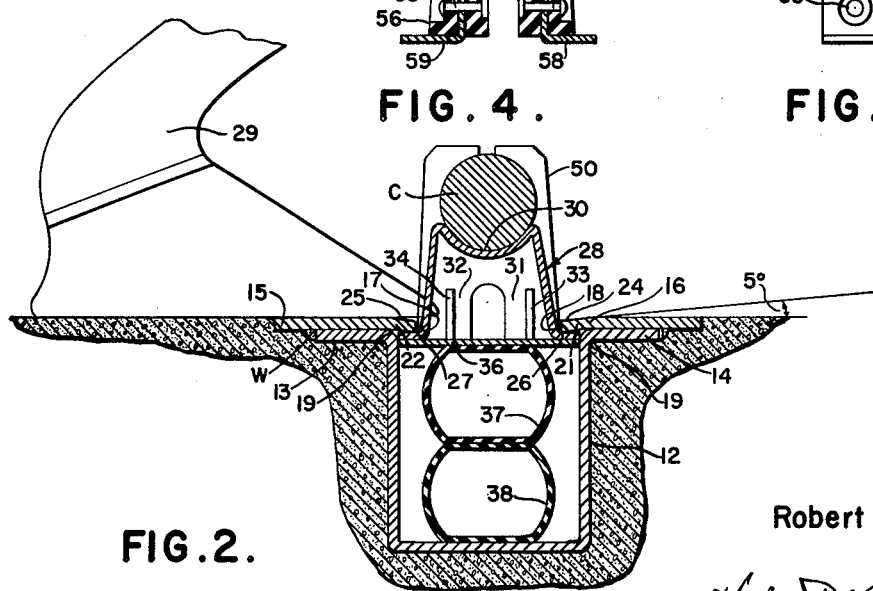
FIGURE 2 is a cross section view taken on the section line 2—2 of FIGURE 1.

Referring in detail to the drawings and first with particular reference to FIGURES 1, 2 and 3, there is shown any suitable landing surface R, such as a concrete runway, a deck surface or the like. Formed across the runway R is a trench 10 in which is installed the complete cable supporting assembly. This assembly comprises an elongated channel member or trough 12 of any suitable material, such as steel or galvanized metal and coterminus with the open top or mouth of the trough 12 are outwardly extending flanges 13 and 14.

The flanges 13 and 14 at each top side of the trough lap over the runway surface R and are preferably seated or countersunk slightly within the bed of the runway surface, see FIGURES 1 and 2. Over each flange are elongated plates 15 and 16. The top of each plate is flush with the top of the runway and suitably bonded to each flange 13 and 14. For example, note the corner weld W in FIGURE 2 of the drawings. These plates 15 and 16 also are relatively wider than their respective contiguous flanges 13 and 14 and the coterminus inner edge 17 of plate 15 and coterminous iner edge 18 of plate 16 project over the bight 19 of the trough flanges 13 and 14 and extend slightly toward each other over the open top of the trough or in the provision of oppositely facing spaced retainer means 21 and 22.

The retainer snap lock means 21 and 22 are used to retain the vital parts of the cable supporting structure in place in the trough, and the projecting retainer or snap lock means 21 and 22 at each free end surface 24 and 25 thereof preferably slope downwardly into the trough, for example, approximately at an angle of five degrees (5°) from the normal horizontal part of the said flanges, see FIGURE 2. The sloping edge surface of each retainer means provides a cam action with respect to the outwardly diverging flanges 26 and 27 of the cradle means 28. For example, the cradle means 28 are made of suitable material or materials for their purpose. As shown in the drawings they are of aluminum and are of inverted U-shape, whereby the legs of the U-shaped cradle provide broad side portions, which when properly positioned with the peak of the inverted U-portion thereof pressed in form a continuous cable rest or support area 30, see FIGURES 1 and 2. The cradle means 28 are made of a material which is sufficiently flexible to have its flanges 26 and 27 snap into position under the retainer means 21 and 22 and are such as may be pierced or disintegrated by the sharp point and the impact of the arrest hook 29 depending from an aircraft during an arrest operation. To facilitate a snap lock installation, the cradle legs 31 and 32 are formed with vertical slots 33 and 34 at the sides, so the legs may be flexed together sufficiently by the cam surfaces 24 and 25 and permit the flanges 26 and 27 thereof to be retracted toward each other enough to snap in into the mouth of the trough 12 under their respective retainer means 21 and 22. After insertion into the mouth of the trough the flanges 26 and 27 move outwardly under the retainer means and are retained at the trough mouth in position for vertical reciprocating movement in the trough 12. An inflatable means 37 is suitably secured as by bonding to a cable retainer means including a carrier plate 36 in the provision of a base for suitable cable retainer means, which plate is slightly smaller than the interior of the trough 12 and extends the entire length of the cable support. The cable support base or plate with the cradle support reciprocates up and down in the manner of a piston when raised and lowered by inflatable and deflatable means positioned between the plate or cable support base 36 and the trough bottom. For example, the trough side of the plate or cable support base 36 may be engaged with inflatable and deflatable members 37 and 38, which may, for example be elongated air tight silicon rubber tubes sealed except for their connection to a pressure line 40 from a control valve 41 of a pressure tank 42, see FIGURE 1. This valve serves to supply air pressure into the members 37 and 38 or to release pressure therefrom and may be manually controlled in situ or from a remote control point, such as from a control tower which would house a suitable remote control panel P such as is illustrated diagrammatically in FIGURE 3. Such panel may be provided with indicator lights 45 and 46, a pressure gauge 47 and an up and down switch means 48.

The arrest cable C is shown in the figures of the drawings and rests in the concave pressed in support cradle areas 30 of each of the aligned contiguous sections of cradle means 28, and connects to any suitable type of arresting gear being used.

The cable cradle supports 28 are snap fitted into the mouth of the trough 12 in contiguous aligned groups A, B and etc., such for example as illustrated in FIGURE 1. Dividing each of the cable cradle support groups is a cable holder 50. This cable holder may be any form of clip, clamp or the like and in the preferred form illustrated is a neoprene block formed with a round opening 51 and a slot 52 at the top portion 53 to provide jaws 54 and 55 to snap fit around a section of the arrest cable C. The base 56 of the cable holder is bifurcated by a slot 57 and has diverging angle bracket members 58 and 59 secured to each bifurcated part of the base 56 by means such as rivets 60. When the angle brackets are riveted in place they serve as latch in retainers and coact with cam surfaces 24 and 25 of the trough, in the same manner as the snap-in flanges 26 and 27.

*Operation*

The foregoing description makes the use and operational performance of the present novel arrest cable support generally clear and the basic novelty and principle of this support is to allow the point of the arrest hook 29 to penetrate the cradle supports 28 as individual separable elements instead of deflecting the assembled entire supporting structures. Thus as an aircraft touches down on the runway R with arrest hook 29 down and approaches the arrest cable support in the elevated position of the cable C, the arrest hook will pierce and disintegrate one section only of the aligned cradle supports 28 of a section A, B, etc. and carry the arrest cable C forward with it down the runway R. The neoprene cable holders 50 being resiliently and yieldably flexible open under the pull of the aircraft hook 29 on the arrest cable C to release the same.

Before the arrest the pressure tank valve 41 is activated to supply air or gas into the line 40 and into the inflatable members 37–38. Such inflation expands the members and raises the carrier plate 36 which supports the arrest cable supports 28 and cable holders 50, until the top surface edges of the carrier plate abut the retainer means 21 and 22 at each side of the mouth of the trough 12.

The arrest cable C is thus raised above the runway R and remains raised until the valve 41 is turned to bleed off the air or gas from the inflated members so that they become deflated and the support means retracts into the trough 12 below the retainer means 21 and 22 in a flush runway position.

If the cable supporting structures are to be raised and lowered by remote control from a control tower, for example, the valve 41 may be solenoid controlled and opened by the operation of the switch 48 shown diagrammatically on the control panel P.

Also, the red and green indicator lights 45 and 46 may be in the solenoid valve circuit to show when the cable support is up or down.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. An arresting cable support comprising a trench in a landing surface, a trough with an open mouth in said trench, retainer means flush with the landing surface projecting over the side edges of the mouth of the trough, inflatable and deflatable means in the trough along the length thereof, a valve connected to a source of fluid pressure, an elongated carrier plate having an upper side and an underside in the trough below said flush landing surface retainer means, said inflatable and deflatable means being between the bottom of the trough and the underside of said plate, arresting cable cradle sections contiguous with the upper side of said plate movable by said inflatable and deflatable means above and below the landing surface, and cable holding means intermittently aligned with said cradle sections.

2. An arresting cable support as described in claim 1, wherein said retainer means at the point of projection of the sides of the trough are slanted downwardly and where each of said cradle sections have flange means at the base thereof engaged under the said retainer means.

3. An arresting cable support as described in claim 1, wherein said cradle sections are individually separable by an aircraft cable engaging arrest hook without disturbing said other sections.

4. An arresting cable support as described in claim 1, wherein said cradle sections are of destructable material and are replaceable by snap action into said trough.

5. An arresting cable support comprising a trench in a landing surface, a trough with an open mouth in said trench, retainer means flush with the landing surface projecting over the side edges of the mouth of the trough, inflatable and deflatable means in the trough along the length thereof, a valve connected to a source of fluid pressure, an elongated carrier plate having an upper side and an underside in the trough below said flush landing surface retainer means, said inflatable and deflatable means being between the bottom of the trough and the underside of said plate, arresting cable cradle sections on the upper side of said plate, and a bifurcated neoprene cable holding means with diverging means secured to each side of the base thereof, said diverging means being locked below said retainer means in the said trough.

6. An arresting cable support comprising an elongated trough, said trough having an open mouth with side flanges, said flanges extending coterminus therewith and being flush with a runway surface, inflatable rubber tube means on the bottom of the trough, means for pressurizing said tube to inflate the same, a plate in said trough above the tube, arresting cable support means movably positioned above said plate, said support means having a concave top portion, side walls and a flexible bottom portion, said bottom portion being retained in said trough by the side flanges thereof, and yieldably resilient cable holders having a cable embracing top in alignment with said concave top portion of the cable support means.

7. A cross cable support, means for raising and permitting retraction of the said support above and below a runway, said support comprising a plurality of sections of cable cradle members with side walls in aligned relation across a runway, said sections being individually detachable from their aligned relation to each other by the impact of an arrest hook of an aircraft with a side wall of one of said cradle members simultaneously with each cable hooking operation.

8. A cross cable support as described in claim 7, wherein each of said individually detachable cradle members are destructable by the impact of the arrest hook with a side wall thereof.

9. A cross cable support as described in claim 7, wherein each of said cradle members are inverted U-shaped aluminum bodies.

10. An arresting cable support comprising a trench in a landing surface, a trough with an open mouth in said trench, retainer means flush with the landing surface projecting over the side edges of the mouth of the trough, inflatable and deflatable means in the trough along the length thereof, a valve connected to a source of fluid pressure, an elongated carrier plate having an upper side and an underside in the trough below said flush landing surface retainer means, said inflatable and deflatable means being between the bottom of the trough and the underside of said plate, and arresting cable holding means contiguous with the upper side of said plate movable by said inflatable and deflatable means above and below the landing surface.

11. An arresting cable support comprising a trench in a landing surface, a trough with an open mouth in said trench, retainer means flush with the landing surface projecting over the side edges of the mouth of the trough, inflatable and deflatable means in the trough along the length thereof, a valve connected to a source of fluid pressure, an elongated carrier plate having an upper side and an underside in the trough below said flush landing surface retainer means, said inflatable and deflatable means being between the bottom of the trough and the underside of said platt, and a bifurcated neoprene cable holding means with diverging means secured to each side of the base thereof, said diverging means being locked below said retainer means in the said trough.

12. An arresting cable support comprising an elongated trough, said trough having an open mouth flush with a landing surface in which the trough is mounted, inflatable and deflatable means adjacent the bottom of the trough, means for inflation and deflation of said means, plate means in said trough above said inflatable and deflatable means, retainer means along each longitudinal edge of the trough for said plate means, and spaced yieldably resilient cable holders carried by said plate means, said holders each having a cable embracing top.

13. An arresting cable support comprising an elongated trough, said trough having an open mouth flush with a landing surface in which the trough is mounted, inflatable and deflatable collapsible means adjacent the bottom of the trough, and means including cable supports on said inflatable and deflatable means releasably supporting said cable above said landing surface when said collapsible means is inflated.

References Cited in the file of this patent
UNITED STATES PATENTS

| | | |
|---|---|---|
| 2,526,541 | Colley | Oct. 17, 1950 |
| 2,777,653 | Cotton et al. | Jan. 15, 1957 |